United States Patent [19]

Jarry et al.

[11] Patent Number: 4,667,026

[45] Date of Patent: May 19, 1987

[54] DEFINED HEAT TREATMENT, UNDER ACIDIC CONDITIONS, OF SOLUTIONS OF POLYSACCHARIDE BIOPOLYMERS

[75] Inventors: Alain Jarry, Melle; Jean-Pierre Gozard, Lyons; Yves Kennel, Melle; Alain Luccioni, Bron, all of France

[73] Assignee: Rhone-Poulenc Specialites Chimiques, Courbevoie, France

[21] Appl. No.: 645,778

[22] Filed: Aug. 30, 1984

[30] Foreign Application Priority Data

Aug. 30, 1983 [FR] France ................. 83 13884

[51] Int. Cl.$^4$ .................. C08B 37/00; C07H 1/00; C09K 3/00; E21B 43/22
[52] U.S. Cl. ..................... 536/114; 166/246; 166/273; 166/274; 166/275; 252/8.55 A; 536/123; 536/124
[58] Field of Search ................ 536/114, 123; 252/8.55 D; 166/246, 273, 274, 275

[56] References Cited

U.S. PATENT DOCUMENTS

| | | |
|---|---|---|
| 3,355,447 | 11/1967 | O'Connell ................. 536/123 |
| 3,415,927 | 12/1968 | Butensky et al. ........... 536/114 |
| 3,591,578 | 7/1971 | Colin et al. ............... 536/114 |
| 4,051,317 | 9/1977 | Towle ..................... 536/114 |
| 4,182,860 | 1/1980 | Naslund et al. ............ 536/114 |
| 4,296,203 | 10/1981 | Wernau .................... 536/114 |
| 4,299,825 | 11/1981 | Lee ....................... 536/114 |
| 4,329,448 | 5/1982 | Cox et al. ................ 536/114 |

FOREIGN PATENT DOCUMENTS

| | | | |
|---|---|---|---|
| 0103483 | 3/1984 | European Pat. Off. | 536/114 |
| 0147948 | 4/1981 | Fed. Rep. of Germany | 536/114 |

Primary Examiner—Johnnie R. Brown
Attorney, Agent, or Firm—Burns, Doane, Swecker & Mathis

[57] ABSTRACT

Aqueous solutions of polysaccharide biopolymers, e.g., Xanthomonas/carbohydrate fermentation worts, are heat treated for more than 5, but less than 60 minutes, at a pH ranging from 3.5 to 6.2, to improve the viscosifying, filterability and injectability properties thereof, and are well adapted, e.g., for secondary and tertiary hydrocarbon (petroleum) recovery by waterflooding therewith.

12 Claims, No Drawings

DEFINED HEAT TREATMENT, UNDER ACIDIC CONDITIONS, OF SOLUTIONS OF POLYSACCHARIDE BIOPOLYMERS

BACKGROUND OF THE INVENTION

1. Field of the Invention

The present invention relates to the treatment of aqueous solutions of heteropolysaccharides, in particular xanthan gum, to improve the viscosity, filterability and injectability thereof. This invention especially relates to the treatment of entire fermentation worts destined for the formulation of aqueous fluids adapted for the displacement of petroleum in partially depleted deposits thereof and hence to assist in its recovery.

2. Description of the Prior Art

Heteropolysaccharides or biopolymers obtained by the fermentation of a carbohydrate under the action of bacteria of the genus Xanthomonas or Arthrobacter, or of fungi of the genus Sclerotium, are widely industrially useful because of such properties as expandability and viscosity.

One of the known uses for heteropolysaccharides of xanthan gum type is in the secondary and tertiary recovery of petroleum. In this application dilute aqueous solutions having a concentration of about 300 to 3000 ppm are used to displace the oil in partially depleted reservoirs thereof. Xanthan gum is characterized by high viscosity at low concentrations, great insensitivity to salinity and to the nature of the salts, and high stability under mechanical stress. However, solutions prepared from industrial grades, either from fermentation worts or by the dilution of a powder which has been precipitated and separated from such worts, have the major disadvantage of rapidly clogging the pores of rock formations into which they are injected, thereby effecting undesirable pressure rises and rapidly preventing any additional recovery of the oil. It too is known that this clogging is due to the presence, on the one hand, of insoluble particles such as cellular debris and nonviable bacteria originating in the fermentation, and on the other, of translucent aggregates or microgels, especially if the solution is prepared from biopolymers which have been precipitated from fermentation worts.

A variety of techniques have been proposed to improve the viscosity and/or filterability and injectability of xanthan gum solutions, including heat treatments, flocculation, enzyme treatments, etc., whether or not with filtration, for example, over diatomaceous earth.

In the process described in U.S. Pat. No. 3,355,447 the liquor is treated at pH 7-9, at a temperature of 65° 14 77° C. for at least 20 minutes, then diluted and filtered to obtain a clarified hydrophilic colloid solution.

U.S. Pat. No. 3,591,578 describes a wort treatment which involves heating the broth at a temperature of 80°–130° C. for from 10 to 120 minutes at a pH of 6.3–6.9 to increase viscosity.

U.S. Pat. No. 3,729,460 features a treatment of the solution at an alkaline pH, providing a modified structure.

In French Patent No. 2,330,697 a treatment is described which is carried out at a temperature greater than 100° C. for from 1 to 300 minutes, the salt concentration is at least equal to 0.5% by weight and the solution is filtered. The polymer treated in a saline medium is set forth as being physically different from a polymer which has not been subjected to such a treatment.

The process described in U.S. Pat. No. 3,773,752 entails diluting the fermentation wort, addition of a coagulant and subsequent filtration, and U.S. Pat. No. 3,801,502 entails addition of an alcohol, a phenol or a nonionic surfactant over the course of the heat treatment.

According to French Patent No. 2,440,992 the salt content is less than 0.2% and the heating is carried out at 60°–98° C. for from 2 to 60 minutes.

In each of the processes immediately above described, the heat treatment is carried out either at the natural pH of the fermentation wort or at an alkaline pH.

Cf. published U.K. Patent Application GB No. 2,111,520 A, which relates to improving the clarity and filterability of xanthan gum solution by treating a crude wort at a pH of 2 to 7 with an effective amount of an acid or neutral protease and then raising the pH to 8 to 13, desirably at a temperature of from 50°–70° C. for from 0.5 to 10 hours. In Table 1, comparative Example 1(c), an inoperative experiment is described which is carried out in the absence of enzyme at a temperature of 60° C., at a pH of 5.5, for 1 hour.

In published European Patent Application No. 0,069,523 is described a process for concentrating a xanthan gum type biopolymer solution by ultrafiltration. A crude wort or solution reconstituted from powder is employed, optionally purified (albeit no details of any purification technique are set forth).

U.K. Patent Specification No. 1,488,645 (published French Patent Application No. 2,318,926) is oriented as regards increasing the viscosity of a xanthan gum wort via heat treatment at 99°–104° C., for a critical time period of from 1 to 5 minutes at a pH of 6–7. No indication of filterability characteristics is given, but, as will later be seen, a heat treatment of insufficient duration is ineffective to enhance filterability.

U.S. Pat. No. 4,299,825 relates to clarifying and concentrating a raw Xanthomonas heteropolysaccharide fermentation broth by filtration and ultrafiltration. The wort may be subjected, prior to filtration, to a heat treatment at 60°–150° C. for from 0.3 to 3 hours. The pH of the heat treatment is unspecified, thus being carried out at a natural pH of from 6.5 to 7.5. The clarified solution has a pH of 6 to 9, however, adjusted by addition of an acid or base.

SUMMARY OF THE INVENTION

Accordingly, a major object of the present invention is the provision of an improved heat treatment for heteropolysaccharides and, more especially, an improved heat treatment of entire fermentation worts under carefully controlled conditions of acidic pH, temperature and time period of treatment, as to markedly increase viscosity, filterability and injectability, without the need for filtration and without modifying the structure of the heteropolysaccharide. Other objects of the invention will become more apparent from the description which follows.

Briefly, the present invention features subjecting an aqueous solution having a biopolymer concentration of 0.05 to 20% to a temperature of about 60° to 110° C. for a critical time period of more than 5 minutes, but less than 60 minutes, with the pH of the solution ranging from 3.5 to 6.2.

DETAILED DESCRIPTION OF THE INVENTION

More particularly according to the present invention, the starting material is a high molecular weight heteropolysaccharide obtained by fermentation of a carbohydrate under the action of appropriate microorganism. Exemplary such microorganisms include, for example, bacteria of the genus Xanthomonas and more particularly the species described in Bergey's *Manual of Determinative Bacteriology* (8th edition, 1974, Williams N. Wilkins Co., Baltimore), such as *Xanthomonas begoniae, Xanthomonas campestris, Xanthomonas carotae, Xanthomonas hederae, Xanthomonas incanae, Xanthomonas malvacearum, Xanthomonas papavericola, Xanthomonas phaseoli, Xanthomonas pisi, Xanthomonas vasculorum, Xanthomonas vesicatoria, Xanthomonas vitians, Xanthomonas pelargonii;* of the genus Arthrobacter and more particularly the species *Arthrobacter stabilis, Arthrobacter viscosus;* of the genus Erwinia; of the genus Azotobacter and more particularly the species *Azobacter indicus;* of the genus Agrobacterium and more particularly the species *Agrobacterium radiobacter, Agrobacterium rhizogenes, Agrobacterium tumefaciens;* and fungi of the genus Sclerotium and more particularly the species *Sclerotium glucanicum, Sclerotium rolfii,* and the like.

Experience has demonstrated that certain species are capable of producing polysaccharides with notable efficiency. The species *Xanthomonas campestris* is particularly suitable for the synthesis of xanthan gum.

A wide variety of carbohydrates may be fermented employing microorganisms of the aforementioned genera to produce the heteropolysaccharide used in the process according to the present invention. Representative carbohydrates are glucose, saccharose, fructose, maltose, lactose, starch, and the like. The fermentation of the carbohydrate is typically carried out in an aqueous medium advantageously containing up to 100 g/l of the glucide. The fermentation medium, also typically, further comprises a source of phosphorus, a source of magnesium which is an enzyme activator, and a source of nitrogen which may either be organic or inorganic, or mixed organic/inorganic in origin.

The preparation of xanthan gum is described in numerous publications and patents. Compare, for example, U.S. Pat. Nos. 3,020,206, 3,020,207, 3,391,060 and 4,154,654.

The biopolymer may be recovered from the wort by precipitation with the aid of a precipitation agent, for example, isopropanol, followed by filtration and drying.

The process of the invention may be applied to solutions obtained by the dissolution in water of a biopolymer powder of commercial grade, but in an advantageous and preferred embodiment of the invention, destined for subsequent use in the recovery of petroleum, the entirety of the liquor from the fermentation process is used.

Upon completion of the process of fermenting and producing the polysaccharide, the liquor normally contains approximately 15 to 50 g/liter of the biopolymer and its pH ranges from approximately 6.5 to 7.5. The pH of the solution is adjusted to 3.5-6.2, preferably to less than 6, by addition of an inorganic or organic acid thereto, such as sulfuric acid, phosphoric acid, nitric acid, formic acid, acetic acid, or the like.

It is not necessary to dilute the liquor.

The biopolymer solution (wort in its entirety or reconstituted solution) is heated to a temperature of from 60° to 110° C. and this temperature is maintained for a period of time necessarily of from more than 5 minutes to less than 60 minutes, and preferably from 7 to 45 minutes.

If the process is applied to an entire fermentation wort, the pH is preferably adjusted to from 4 to 5.5 and the heat treatment is preferably carried out at a temperature of from 80° to 100° C. for from 15 to 30 minutes.

After the treatment in an acid medium, the biopolymer solution may be subjected to a mechanical separation, for example, filtration over diatomaceous earth or centrifugation, but such separation is not necessary if the fermentation wort has been treated according to the process of the invention.

The biopolymer may be isolated from the solution or the wort by conventional means, for example, by precipitation with a lower alcohol, followed by drying by atomization or in a drum.

A biocide or an enzyme may also be added, if so desired, to the solution that has been heat treated, or to the powder precipitated therefrom. In one embodiment of the invention if the biocide or the enzyme are stable under the conditions of heating in the selected acid medium, they may be added prior to the heat treatment stage.

The heteropolysaccharide solutions resulting from the treatment in the acid medium and also the powders isolated from such solutions are well adopted to increase viscosity, and are easily filterable and injectable.

A dilute solution, such as those resulting from the fermentation process, is at a disadvantage, because it cannot be transported economically. The polymer in powder form also presents problems because of the need for the redissolution thereof at the site of utilization. It may be advantageous in certain cases to produce a concentrated solution of the biopolymer. This concentration may be effected by conventional means, such as evaporation or ultrafiltration, the latter method being preferred as it is more economical and enables, on an industrial scale and in a manner per se known, separation of the low molecular weight molecules from the high molecular molecules and concentration of the polymers without altering their rheological properties. It has been determined in particular that ultrafiltration, even at a high velocity gradient, does not modify the viscosifying properties and the filterability of the solutions.

Concentration by ultrafiltration may be carried out by the use of known methods and equipment, for example, plate, helical or tubular such apparatus. An apparatus employing grooved plates is preferred, in which the polymer may be exposed to high velocity gradients of from 1000 to 10,000 $s^{-1}$, appreciably reducing the apparent viscosity of the composition, which permits rapid transportation in large surface industrial equipment (10–50 $m^2$ units) and an improved transfer operation. Apparatus of this type is described in published French Applications and Patents Nos. 2,127,155, 2,141,417, 2,392,696, 2,400,380 and 2,471,507. Commercially available membranes may be used in conjunction therewith, such as cellulosic membranes, inorganic membranes, polymer membranes, such as polyamide, polybenzymidazole, acrylic copolymer, polyacrylonitrile, polysulfone, polyvinylidene fluoride, complex polyelectrolytic membranes, the cutoff threshold of which varies from 10 to 100,000.

The flux is a function of temperature, pressure, speed of flow and of the viscosity and concentration of the biopolymer. It is on the order of 5 to 50 l/hour. m² for a linear velocity of 0.5 to 5 m/sec. Temperatures ranging from ambient to approximately 80° C. and pressures on the order of 1 to 15 bars, preferably 1 to 6 bars, are preferred.

The wort may also be purified during ultrafiltration by decomposing the proteinaceous materials contained therein by means of addition of a proteolytic enzyme thereto.

According to another preferred embodiment of the invention, the polysaccharide solution may be further purified by diafiltration, by adding water continuously or periodically during or after ultrafiltration, at a rate essentially corresponding to that of the removal of the ultrafiltrate.

The purified biopolymer may be used directly in the form of a wort, or may be recovered in the form of a powder by any known means.

Ultrafiltration normally permits obtaining concentrations of 70 to 180 g of biopolymer/kg of wort. It may be carried out prior to the heat treatment according to the invention, but preferably it is effected after said heat treatment.

It has also been found that the heat treatment in an acid medium according to the invention improves the performance of the ultrafiltration process vis-a-vis that of a wort without heat treatment, or treated under neutral or alkaline pH conditions consonant with the prior art.

In particular, with the same pressure drop between the terminals of the ultrafilter, the heat treatment in the acid medium provides more concentrated biopolymer solutions with higher rates of feed. Concentrations of up to 200 and even 300 g/kg of the wort may be obtained.

The heteropolysaccharide solutions resulting from the treatment according to the invention, together with the powders isolated from these solutions may be used in all xanthan gum applications and, more specifically, in applications requiring clarified products, in particular for purposes of the assisted recovery of petroleum.

In order to further illustrate the present invention and the advantages thereof, the following specific examples are given, it being understood that same are intended only as illustrative and in nowise limitative.

EXAMPLE 1

Two fractions of 20 liters each of a fermentation wort containing 2% by weight xanthan gum were isolated. The pH was adjusted to 5.5 by the addition of concentrated sulfuric acid to each fraction.

One of the fractions was continuously subjected to a heat treatment of 15 min at 100° C. and was then cooled to 25° C. The other fraction (control) was maintained at 25° C. for the same period of time.

For purposes of comparison, the same treatment was applied to fractions of the same wort, the pH of which had been adjusted to 8.5 by the addition of sodium hydroxide thereto.

The effectiveness of the treatment was determined by measurements of the viscosity and filterability of solutions diluted to a concentration of 1000 ppm in polymer, utilizing for the dilution an aqueous solution containing 9% salts (NaCl, CaCl₂, ratio 10/1).

Filterability test at constant flow rate:

The capacity for clogging of well formations was determined by passing the solution at a constant rate of flow, corresponding to a velocity of 80 ml/hour, through a porous filter simulating injection in the field.

Using a differential pressure transducer, the pressure drop generated at the inlet and the outlet of the aforesaid porous medium was determined after flow of 1,300 ml of the solution.

The filterability index is the ratio of the pressures obtained at the onset and the completion of the flow.

Viscosity measurements were taken using a Brookfield viscosimeter equipped with a UL adaptor, at 25° C. and 7.3 s⁻¹.

TABLE I

| Conditions of Treatment; duration = 15 min | | Filterability index | Viscosity mPa.s |
|---|---|---|---|
| Temperature °C. | pH | | |
| 25 | 5.5 | 1.77 | 45.4 |
| 100 | 5.5 | 1.39 | 58.7 |
| 25 | 8.5 | 1.91 | 46.3 |
| 100 | 8.5 | 2.98 | 44.4 |

EXAMPLE 2

The effects of pH and the treatment temperature on the viscosity and filterability of the solutions were studied on fermentation worts of different origin. In all of the experiments, conducted upon 15l fractions, the duration of the heat treatment was 15 min. After cooling to ambient temperature, the samples were diluted to a concentration of 1,000 ppm in xanthan gum in 9% brine to determine the filterability index and viscosity using the tests described in Example 1. The results are reported in the Table II which follows:

TABLE II

| Test | Source of wort | pH | Treatment Temperature °C. | Filterability index | Viscosity in mPa.s |
|---|---|---|---|---|---|
| 1 | A | 5.5 | 100 | 1.09 | 60.8 |
| 2 | A | 5.5 | 80 | 1.113 | 63.3 |
| 3 | A | 4 | 100 | 1.11 | 63.4 |
| 4 | A | 3.2 | 100 | 1.42 | 51 |
| 5 | B | 5.5 | 100 | 1.14 | 51.5 |
| 6 | B | 6.8 | 100 | 1.30 | 39.2 |
| 7 | C | 5.5 | 100 | 1.12 | 50.9 |
| 8 | C | 6.8 | 100 | 1.22 | 38.3 |

EXAMPLE 3

This example illustrates the enhanced suitability for injection into well formations of a wort treated in an acid medium compared to a wort treated without modification of its pH.

A crude fermentation wort containing 2% by weight xanthan gum and having a pH of 6.8 was used.

One fraction of the wort was adjusted to pH 5.5 by the addition of H₂SO₄ thereto. This fraction was itself divided into 4 aliquot portions of 5 items each. Each portion was treated at 60° C. or 100° C. for 7 min, 30 sec, or 15 min.

As a comparison, the same treatment was carried out on another fraction of the wort, without modifying the pH thereof.

After the heat treatment and cooling to ambient temperature, each of the samples was diluted to a concentration of 1,000 ppm in xanthan gum, using therefor an aqueous solution containing 75 ppm calcium ions in the form of the chloride.

The samples were subjected to a flow test at constant pressure.

This test consisted of measuring the volume of the solution of 1,000 ppm filtered through a Sartorius membrane having pore dimensions of 12 μm (diameter: 47 mm) under a constant pressure of 60 millibars, for a time period of 30 min. The results are reported in the following Table III:

TABLE III

| Treatment | | | |
|---|---|---|---|
| Temperature °C. | pH | Duration | Volume of flow, in ml |
| 60 | 5.5 | 7 min, 30 sec | 1840 |
| 100 | 5.5 | 7 min, 30 sec | 1820 |
| 60 | 5.5 | 15 min | 1950 |
| 100 | 5.5 | 15 min | 2420 |
| 60 | 6.8 | 7 min, 30 sec | 690 |
| 100 | 6.8 | 7 min, 30 sec | 926 |
| 60 | 6.8 | 15 min | 920 |
| 100 | 6.8 | 15 min | 784 |

EXAMPLE 4

This example illustrates the effect of pH, temperature and the duration of treatment of the wort vis-a-vis the injectablility and the viscosity of solutions prepared from xanthan gum powder.

After the treatment of the fermentation wort under the various conditions reported in Table IV, the biopolymer was precipitated by the addition of isopropane, and then washed and dried.

For each of the test, 1 g of the powder was dissolved in water, under agitation by means of a screw agitator, at ambient temperature. This solution was diluted with brine such that the resulting solution contained 1,000 ppm xanthan gum and a $CaCl_2$ concentration of 75 ppm.

Table IV which follows reports the flow rates according to the test described in the preceding example and the viscosities of solutions prepared from the polymer treated in an acid medium and of the polymer treated without changing its pH.

TABLE IV

| Treatment | | | | |
|---|---|---|---|---|
| Temperature °C. | pH | Duration | Volume of flow, in ml | Viscosity in mPa.s |
| 60 | 5.5 | 7 min, 30 sec | 2450 | 59.8 |
| 100 | 5.5 | 7 min, 30 sec | 1820 | 74 |
| 60 | 5.5 | 15 min | 2090 | 60 |
| 100 | 6.8 | 7 min, 30 sec | 1040 | 62.5 |

EXAMPLE 5

A fermentation wort containing 20.4 g/kg of xanthan gum was adjusted to pH 5.5 and treated for 15 min at 100° C.

The wort was subsequently concentrated by ultrafiltration using a Pleiade UFP module fitted with acrylonitrile IRIS 3038 (trademarks of the Rhone-Poulenc Recherches Co.) membranes, having a surface area of 1.54 m² and a cutoff threshold of 20,000. The linear velocity of the wort was 0.6 m.s⁻¹ and its temperature was 40° C.

The results are reported in the Table V which follows:

TABLE V

| Duration of ultrafiltration (min) | Weight retained (kg) | Flow rate of ultrafiltrate (l/h · m²) | Concentration in xanthan gum in the retentate (g/kg) | Apparent viscosity (mpa.s) | Pressure in bars | |
|---|---|---|---|---|---|---|
| | | | | | Inlet | Outlet |
| 0 | 44 | 17 | 20.4 | 5,000 | 2 | 1 |
| 30' | 30.25 | 18.7 | 29.7 | | | |
| 45' | 22.15 | 21 | 40.5 | | | |
| 60' | 17.15 | 13 | 52.3 | | | |
| 75' | 11.95 | 13.5 | 75.1 | 8,900 | | |
| 90' | 9.58 | 12.1 | 93.7 | 10,800 | 2.8 | 1 |

The viscosity and the injectability of the solutions diluted to 1,000 ppm were identical, both before and after concentration.

EXAMPLE 6

Concentration of the product of fermentation was carried out by ultrafiltration using the same apparatus as in Example 5.

The experiments were conducted using a fermentation wort containing 20 g/kg xanthan without any heat treatment, with treatment in an acid medium according to the invention, and with treatment in a medium having a pH of 7.5.

In a first series of experiments, the rate of circulation was maintained at a constant value and the pressure drop at the terminals of the ultrafilter was measured. It was found that in obtaining a solution having essentially the same concentration, the pressure drop was less when the wort had been heat treated, with the treatment at pH 5.5 being better than at pH 7.5.

In a second series of experiments, the same pressure drop was maintained at the terminals of the ultrafilter. It was found that the treatment in an acid medium improved the possibility of obtaining more concentrated solutions with larger rates of circulation compared with an untreated wort, or a wort treated at pH 7.5.

TABLE VI

| | Ultrafiltration | | |
|---|---|---|---|
| Treatment | Rate of circulation (l/hour) | Pressure drop | Concentration (g/kg) |
| none | 90 | 4.3 | 52.0 |
| pH 7.5/100° C./15 min | 87 | 3.5 | 49.6 |
| pH 5.5/100° C./15 min | 87 | 2.65 | 48.4 |
| none | 43 | 5.7 | 66.4 |
| pH 7.5/100° C./15 min | 52 | 5.5 | 75.2 |
| pH 5.5/100° C./15 min | 48 | 5.5 | 102.0 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for improving viscosifying, filterability and injectablility properties of an aqueous solution of a polysaccharide biopolymer, comprising heat treating such solution, having a biopolymer concentration ranging from 0.05 to 20% by weight, at a temperature of from about 60° to 110° C. for a period of time in excess of 5 minutes but less than 60 minutes, at a pH ranging from 3.5 to less than 6.

2. The process as defined by claim 1, said polysaccharide biopolymer comprising xanthan gum.

3. The process as defined by claim 1, said aqueous solution having been prepared by dissolution in water of a powder of said polysaccharide biopolymer.

4. The process as defined by claim 1, said aqueous solution comprising a fermentation wort.

5. The process as defined by claim 4, said aqueous solution comprising a Xanthomonas/carbohydrate fermentation wort.

6. The process as defined by claim 4, said fermentation wort having been concentrated by ultrafiltration.

7. The process as defined by claim 4, comprising heat treating said wort at a temperature of from 80° to 100° C. for from 15 to 30 minutes, at a pH ranging from 4 to 5.5.

8. The process as defined by claim 1, further comprising concentrating said heat treated aqueous solution by at least one of ultrafiltration and purifying same by diafiltration.

9. The process as defined by claim 1, said aqueous solution comprising a biocide, enzyme, or combination thereof.

10. The process as defined by claim 1, said heat treatment being for a period of time ranging from 7 to 45 minutes.

11. In a hydrocarbon recovery process wherein subterranean petroleum deposits are flooded with an aqueous solution of a polysaccharide biopolymer, the improvement which comprises, utilizing as said aqueous solution therefor, a diluted solution prepared by the process as defined by claim 1.

12. The process as defined by claim 1, wherein the pH of the solution is adjusted to 3.5 to less than 6 by addition of an inorganic or organic acid thereto.

* * * * *